United States Patent [19]

Lofgren et al.

[11] 4,416,335

[45] Nov. 22, 1983

[54] GROUND-CLEARING AND MOUND-BUILDING SCARIFIER

[75] Inventors: Stig-Gunnar Lofgren, Jarved; Bo G. Ekeborg, Bonassund, both of Sweden

[73] Assignee: Mo och Domsjo Aktiebolag, Ornskoldsvik, Sweden

[21] Appl. No.: 328,309

[22] Filed: Dec. 7, 1981

[30] Foreign Application Priority Data

Dec. 16, 1980 [SE] Sweden ................................ 8008842

[51] Int. Cl.³ ...................... A01B 33/06; A01B 49/04; A01B 63/08; A01B 63/111
[52] U.S. Cl. .......................................... 172/2; 172/57; 172/120; 172/121; 172/125; 172/438; 172/464; 172/506
[58] Field of Search ..................... 172/1, 2, 35, 48, 57, 172/60, 61, 75, 82, 83, 90, 118–125, 107, 108, 172/29, 30, 315, 260.5, 438, 464, 506

[56] References Cited

U.S. PATENT DOCUMENTS

| 600,303 | 3/1898 | Christman | 172/61 |
|---|---|---|---|
| 702,071 | 6/1902 | Paulsen | 172/90 |
| 1,289,884 | 12/1918 | Opalka | 172/60 |
| 1,819,950 | 8/1931 | Dufour | 172/124 X |
| 1,843,095 | 1/1932 | Urschel | 172/60 X |
| 2,118,462 | 5/1938 | Doonan | 172/61 |
| 2,234,534 | 3/1941 | Reno | 172/60 X |
| 2,437,168 | 3/1948 | Marihart | 172/2 UX |
| 3,508,617 | 4/1970 | Paynter | 172/118 X |
| 4,002,205 | 1/1977 | Falk | 172/123 X |
| 4,117,888 | 10/1978 | Fuller et al. | 172/1 |
| 4,359,101 | 11/1982 | Gagnon | 172/108 X |

FOREIGN PATENT DOCUMENTS

| 2363269 | 5/1978 | France | 172/260.5 |
|---|---|---|---|
| 527664 | 6/1955 | Italy | 172/122 |
| 756615 | 9/1956 | United Kingdom | 172/60 |
| 542488 | 2/1977 | U.S.S.R. | 172/90 |

*Primary Examiner*—Paul E. Shapiro

[57] ABSTRACT

A ground-clearing and mound-building device is provided that can be towed along the ground to move material on the surface to one side, expose the surface of the ground, and build mounds on the cleared ground for planting and forest regeneration, having a scarifier means mounted for rotation about its central axis, circular in cross-section, and having a peripheral surface that digs into the ground during rotation thereof when in contact with the ground under pressure, arranged to be brought into contact with the ground at any selected contact pressure; with control of at least one of the selected contact pressure and the selected rotation rate to dig, loosen, and displace a surface layer of the ground and push such loosened ground into mounds.

9 Claims, 4 Drawing Figures

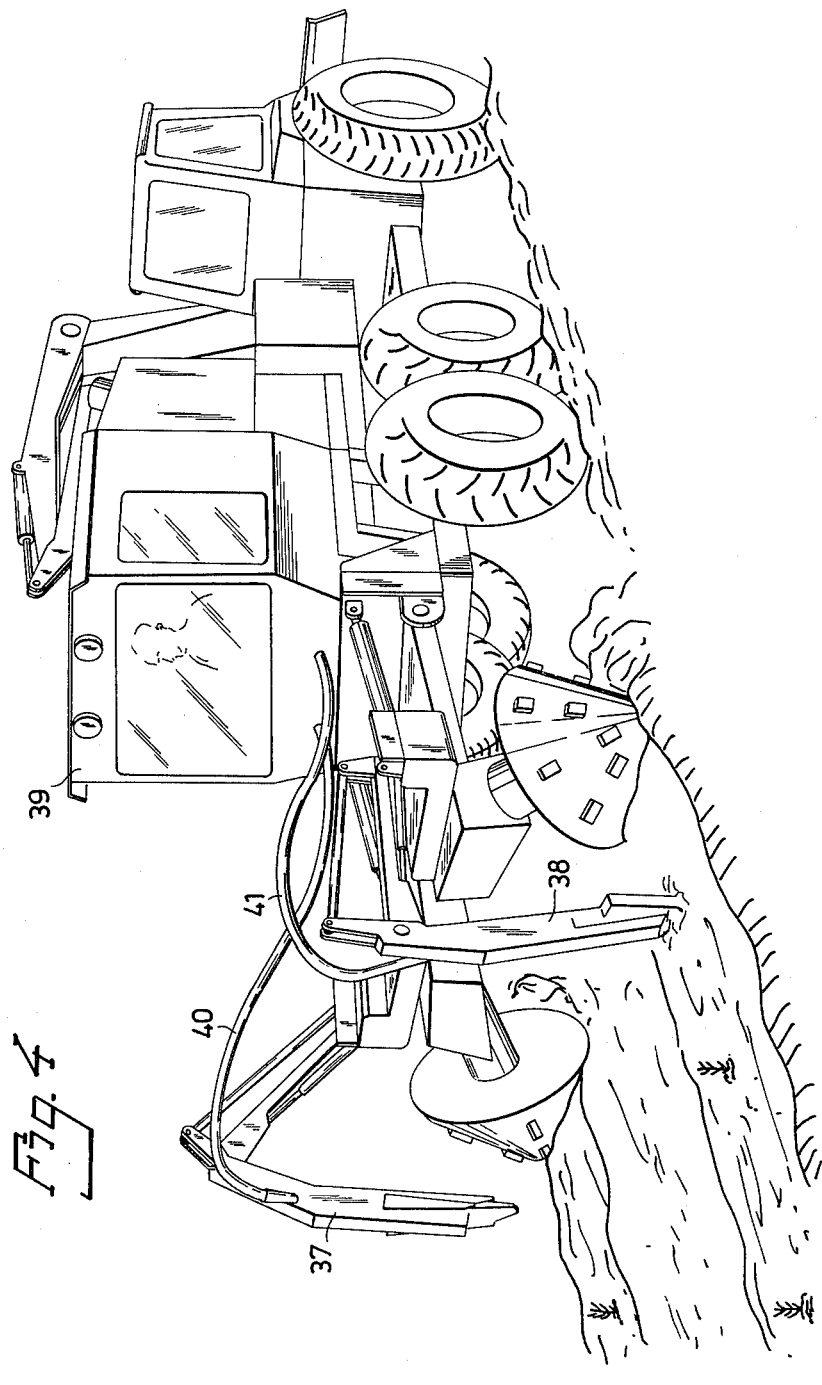

GROUND-CLEARING AND MOUND-BUILDING SCARIFIER

At the present time in Sweden, about 300,000 hectares of woodland are cleared annually. Of this, about 180,000 hectares are replanted, while the remainder is allowed to regenerate by itself. In total, about 100,000 hectares of ground are prepared or scarified for replanting, and in future this area will probably increase. There are similar requirements in other countries with forest industries.

In order to prepare the ground for planting, it is necessary to lay it bare, since after clearing the ground is normally covered with loose brush, twigs, branches and similar loose material, debris from the cutting of the trees. After that, the ground has to be prepared to provide a favorable environment for the germination of seeds and the growth of plants.

When the ground is suitably prepared, the ground temperature is higher during the day, while during the night more heat is radiated from the bare ground, thereby reducing the risk of damage by frost, besides making the ground more receptive to water, and better capable of absorbing the rays of the sun. The risk of attack by harmful insects and fungi is also reduced.

The available ground clearing devices are of several types, but none is entirely satisfactory. Most are carried on vehicles, and are arranged to prepare the ground intermittently or continuously.

Devices of one type normally use a rotatable drum or reel with cutting or tearing blades, by means of which the loose brush is cleared over an area from 0.5 to 0.7 meter wide, and from 1 to 1.2 meters long, after which planting is effected in the cleared bare ground. It is not possible to expose a larger surface area because of the heaps of brush which accumulate in front of the drum or reel. In addition, a very high tractive force is required to move the drum or reel over the surface of the ground.

Means have to be provided to clear the brush from the apparatus, usually by lifting the drum or wheel from the ground. As a result, the productivity is rather low. Moreover, the heaps of brushwood that accumulate obstruct the planting, whether manually or by machine. Moreover, stones or projections from the ground make it difficult to push the loose brush and branches away from the cleared area.

Another type of device for continuously clearing the ground moves the brush to one side using a rotatable or conical cutter, or a cutting wheel whose axis of rotation lies in the direction of travel of the apparatus. Such apparatus is capable of clearing a strip of ground about 0.5 to 0.7 meter wide. This apparatus likewise, however, is obstructed by stones and stubs projecting from the ground, making it inefficient in clearing, and requiring a high tractive force.

The disadvantages of both these types of apparatus arise from the large and cumbersome clearing means, which are not only massive but which have a high working surface area in contact with the ground, increasing the effort needed to move the apparatus along the ground, and also increasing its susceptibility to obstruction.

After the ground has been cleared, it is frequently necessary to prepare the ground further, in order to provide a favorable environment for seed germination and plant growth. This requires scarification of the ground, so as to loosen up the surface layer. This may be done continuously or in selected patches, as required for planting and seeding. A typical scarifier has two rotatable conical elements which have a peripheral surface in contact with the ground and provided with teeth, which are brought to bear against the ground and rotated so that the teeth tear into the ground and loosen it up.

In many cases, it is advantageous to plant seed or new plants in mounds or heaps raised above the general level of the surrounding ground. This raises the ground temperature, and it also assists in preventing the plants from being choked out by weeds. Several types of mound-forming devices are known, the most common being a horizontal scraper or dozer blade, arranged at an angle transversely to the direction of travel, and pushing the soil in front of it as it moves forward. The scraper or dozer blade is lifted from time to time, so as to leave behind the pile or ridge of soil formerly in front of the blade. Mounds and heaps can also be formed using apparatus comprising a wheel with peripheral digging devices or scoops. When the wheel is rotated, each scoop lifts a mound of soil and deposits it on the ground in a row of mounds whose spacing is determined by the distance between scoops on the wheel and the rate of rotation of the wheel.

Both these types of devices collect not only soil but also whatever other objects are there to be gathered up, and the heaps and mounds that are formed as a result contain stones, brush and other objects, which pose difficulties later on, when the mounds are to be seeded or planted.

In accordance with the present invention, a ground-clearing and mound-building device is provided that can be towed along the ground to move material on the surface to one side, expose the surface of the ground, and build mounds on the cleared ground for planting and forest regeneration, comprising, in combination:

(1) a frame arranged to be attached to a vehicle above the ground;

(2) a scarifying means mounted on the frame for rotation about its central axis, circular in cross-section and having a peripheral surface that digs into the ground during rotation thereof when in contact with the ground under pressure;

(3) means for moving the scarifying means into and away from contact with the ground and arranged to bring the scarifying means into such contact with the ground at any of a plurality of selected contact pressures;

(4) drive means for rotating the scarifying means at a selected rotation rate; and (5) means for controlling at least one of the selected contact pressure and the selected rotation rate to dig, loosen, and displace a surface layer of the ground and push such loosened ground into mounds.

In order to form mounds in the exposed ground, either or both of (1) the contact pressure and
(2) the rate of rotation of the scarifying means in contact with the ground is varied as the scarifying means is being carried forward along the ground, while keeping the scarifying means constantly in contact with the ground. An increase in pressure and/or rate of rotation causes the scarifying means to dig deeper, loosen more soil and build up the loosened soil in front of the device to a level above the ground. The loosened soil is pushed in a bow shape forwards, upwards and outwards, and thus a soil mound is formed before the scarifier, which moves to one side, while more soil is added by the scarifier, mostly at the big end, if it be conical. Then, when the contact pressure and/or the rate of rotation is reduced, and the scarifier can raise up a little, although still in contact with the ground, the mound remains in the track, and the soil in the mound is pushed aside, forwards and outwards at an angle of about 45°. Thus, the mounds can be formed and deposited without lifting the scarifying means off the ground, although of course this can be done too, if desired.

By arranging the scarifying means at an angle to the direction of travel of the vehicle on which the means is being towed, the pressure and/or rotating action can be utilized to at the same time push the mound of earth to one side, and thus locate the mounds one after the other in a row along the travel path of the vehicle.

Whereas prior scarifiers having rotary working elements also push brush, humus and stones to one side, they have a tendency at the same time to combine such material into the mounds. The scarifying means in accordance with the invention, in contrast, can be made to produce mounds which are singularly free from such objects, simply by from time to time reducing the contact pressure so that the scarifying means can become elevated, with respect to the normal ground surface, although still in contact with the soil in the mound. By combining the variations from time to time in one or both of contact pressure and rate of rotation, the scarifying means can be made to pass over a mound of soil before it, and leave it behind. Thus, it is possible to overcome the difficulties of the prior devices, and at the same time utilize conventional scarifiers such as disc harrows, disc routers, cone routers, and cylinder routers, as the scarifying means in accordance with the invention.

Preferred embodiments of the invention are shown in the attached drawings, in which:

FIG. 4 shows a modification of the vehicle and scarifying apparatus of FIG. 1, including a device for planting plants in the mounds build up by the scarifier.

Figure 1:
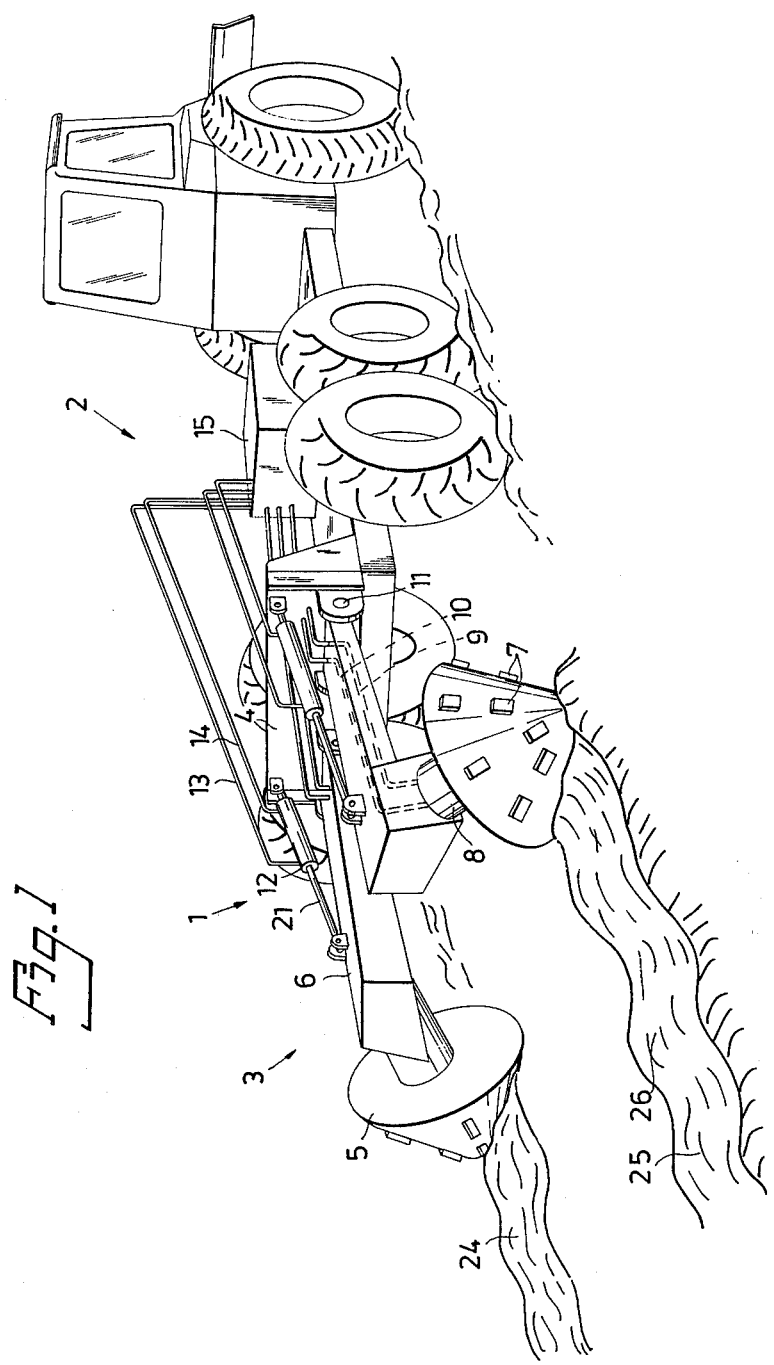
FIG. 1 is a perspective view showing a vehicle carrying a scarifier in accordance with the invention, in which the scarifying means is in the form of a pair of frusto-conical members having toothlike protuberances on their peripheral surfaces in contact with the ground.

The apparatus shown in FIG. 1 has a twin scarifier 1 mounted to the rear of a tractor or land rover 2, especially designed for travelling over rough ground, such as cleared woodland. The twin scarifier includes a pair of ground routers 3, one on each side of the vehicle directly behind the rear wheels, mounted on the twin frame structures 6, 6′, each pivotally mounted on the horizontal shaft 11, for pivoting movement down into contact with the ground and up away from contact with the ground.

Each router 3 has as the scarifying means a truncated 90° cone 5, extending straight out from the frame structure 6 on which it is mounted. The cones 5 are arranged to be rotated in the reverse direction to the direction of rotation of the vehicle wheels 23, i.e., counterclockwise, as opposed the clockwise rotation of the wheels, when the vehicle is moving forward.

Each cone has an outer peripheral surface 5a which can be brought into contact with the ground, and is provided with teeth 7. Upon rotation, the cones 5 not only aid in moving material on the ground surface to one side of the travel path of the vehicle 2, but also while under pressure contact with the ground the teeth 7 dig into the ground, loosen it, and under counter-clockwise rotation push it outwardly and upwardly in a pile before the cones 5 as the vehicle 2 moves forward.

The cones 5 are driven for rotation by planetary gearing and a hydraulic motor within the cylindrical housing 8; these components are not shown in FIG. 1 because they are of conventional construction.

During rotation of the cones 5, the teeth first skim off material along the surface of the ground, including humus, brush and branches, and then, as the teeth dig into the ground, a small amount of soil is pushed up before the cone. This material is moved forward, upward and outward with rotation of the cone towards the apex of the cone, because the peripheral rate of rotation is higher at the base of the cone than at the apex end. Thus, a surface layer of the soil is pushed up by the cone to form a mound or ridge suitable for planting purposes in the travel path behind the vehicle, just inside the row of brush, branches and humus previously cleared from the ground to expose it. In this way, as seen in FIG. 1, a series of mounds or heaps or undulations 24, 25, 26 are created in the ground, with the brush and other loose material (not shown) along the outer edges of these mounds.

The frame structures 6 pivotably mounted on the shaft 11 are moved up and down with respect to the surface of the ground by a pair of hydraulic piston cylinders 12, within which the pistons 21 are reciprocated to and fro by application or withdrawal of hydraulic fluid, such as oil, on the two sides of the piston 21, through the fluid lines 13, 14. Hydraulic fluid is also supplied to the hydraulic motor in the housing 8 by the supply lines 9 and 10.

Fluid is circulated through the hydraulic supply lines under the direction of the control unit 15, which is arranged to control the vertical position of the cones 5 by varying the hydraulic pressure in the lines 13, 14, which directly modifies the pressure by which the cones 5 are thrust against the ground by moving the hydraulic pistons 21 in the cylinders 12, and to change this pressure at selected intervals either with respect to time or distance. Upon increasing the hydraulic pressure, the piston 21 moves out, and the cones 5 dig deeper. Upon reducing the hydraulic pressure, the cones 5 move upward as the pistons 21 move in. They can thus be lifted off the ground entirely, on turns, or to clear obstacles, or in travel.

The speed of the hydraulic motors in the cylinder housing 8 can also be regulated by the control unit 15, so that the rate of rotation of the cones 5 can be controlled between a rate at which more or less of the skimmed ground surface material is cleared off to one side, and a rate of which the heaps or mounds are built up and left behind.

Figure 2:
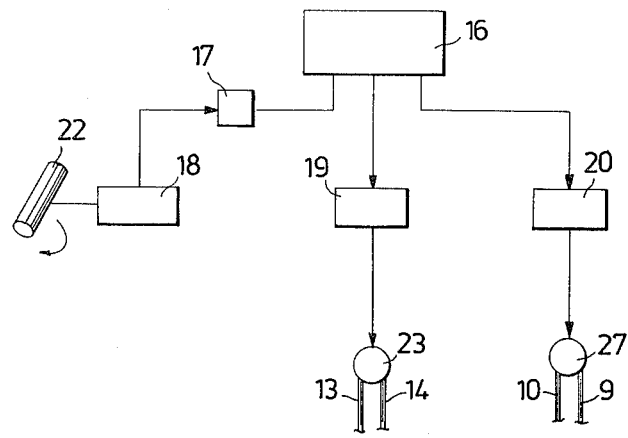
FIG. 2 is a schematic diagram showing a control system for the scarifier shown in FIG. 1.

FIG. 2 shows the component circuitry of the control unit. This includes a control means 16, arranged to receive signals from a counter 17, which in turn receives signals from a device 18 which measures the distance travelled in a unit time by the vehicle 2. The counter 17 is a common pre-selective counter such as a Veeder Root 7993, that counts a selected number of pulses, then gives a signal, and resets itself automatically for a new count. Connected to the control means 16 are the regulator 19, for regulating the pressure at which the cones 5 contact the ground, or the level of frame structures 6 above the level of the ground, and the regulator 20, for regulating the speed of the hydraulic motors that drive the cones.

The regulator 20 is a Moog controller which responds to an electric signal to control oil flow in the pump.

The device 18 may, for example, by a transducer, arranged to measure the rate of rotation of the driveshaft 22 of the vehicle 2, and control the rate of rotation of the cones accordingly.

The control means 16 can for example be an all solid state logic control system capable of performing the same functions as relays, static controls or card logic control systems, such as an STI Programmable Control System of Texas Instruments, including a programmable sequencer, a programmer, and an input/output system. The regulator 19 is a part of the pump unit, and converts an electric signal into a hydraulic pressure, for instance, a Wand Fluh NG 4-mini.

The operation of the control unit shown in FIG. 2 is as follows: Assume that a mound of earth has just been formed, and that a signal has been sent causing the cones 5 to be pushed against the ground at a selected pressure that is high enough to dig and move the largest possible amount of earth forward, up, and outward.

The forward movement of the vehicle 2 is measured continuously by the transducer 18, according to the number of revolutions of the driveshaft 22, this being directly proportional to the distance travelled by the vehicle. For each unit of the distance travelled, that is, for each revolution of the drive shaft 22, the transducer 18 sends one pulse or signal to the counter 17. When a given number of signals or pulses corresponding to the selected distance between two mounds of earth has been counted, the counter 17 sends a control signal or pulse to the control means 16, which sends a signal or pulse to the regulating device 19.

The regulating device 19, which can be adjusted to send a working signal or pulse of the desired magnitude, sends this working signal or pulse to a pump unit 23 containing the valves needed for control of the hydraulic fluid circulated through the various lines, noted above. The pump unit 23 accordingly withdraws a quantity of hydraulic fluid from the piston cylinder device 12 via line 14. That reduces the contact pressure of the cones 5 against the ground. The piston 21 moving the piston inward is drawn into the cylinder for a distance according to the magnitude of the signal or pulse; since the pressure exerted by the cones 5 against the surface of the ground either decreases, or stops all together, the cones 5 cease digging, and move upward, leaving behind a small amount of earth as a new heap or mound.

After a given period of time has elapsed, corresponding to the desired breadth or length of the mound, the control means 16 sends a return signal to the pump unit 23 by way of the regulating device 19, whereupon hydraulic fluid is supplied by the pump unit to cylinder 12 via line 13, whereupon the two cones 5 contact the ground with increased pressure, and are returned to their soil-digging position.

At the same time as the control means 16 sends the first-mentioned signal to the regulating device 19, reducing the cones contact pressure, it may also send a signal to the regulating device 20, which then sends a working signal to a pump unit 27, which decreases the amount of hydraulic fluid fed to the hydraulic motor, causing the cones 5 to be driven more slowly. With this reduction in the rate of rotation, added to the reduced contact pressure, the size of the mounds may increase, while the digging of soil by the cones per unit time also decreases.

After a given length of time has elapsed, corresponding to the desired breadth or length of the mound that has been built up, the cones 5 are returned to their higher speed, while the pressure at which they contact the surface of the ground may be increased.

The control means 16 may be manually set so that, as mentioned above, the apparatus is operated both by increasing the contact pressure against the ground surface and increasing the rate of rotation of the cones, or by only one of these two variables.

Figure 3:
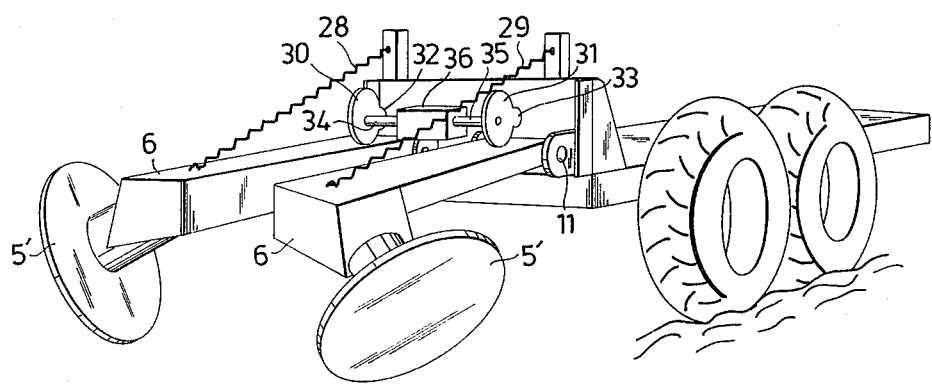
FIG. 3 shows another embodiment of the invention in which the scarifier takes the form of twin flat discs.

It is also possible to replace the hydraulically operated scarifier components by mechanically operated scarifiers, the mechanism increasing the pressure between the cones and the surface of the ground to form a planting mound. A simple illustration is the device with rotatable discs 5', shown in FIG. 3. The discs rotate in a plane running obliquely transverse to the vehicle path. Their peripheral surface can be provided with teeth similar to the teeth 7 of the cones 5 of the device shown in FIG. 1.

These devices function in a manner very similar to that of the cones, except that they do not have an extended area of contact with the ground, with a variable rate of rotation at the surface that decreases towards one end. In place of discs, any other type of scarifying means can be used, such as cylinders and 90° full cones.

The scarifying discs 5' are arranged one on each side of the vehicle, as are the cones 5 of the device of FIG. 1. In order to apply a selected contact pressure between the discs 5 and the ground, the frame structures 6' are arranged to pivot about the shaft 11, and are attached to compression springs 28, 29 that bias them upwardly, away from the ground. To provide a periodic increase and then decrease in the contact pressure of the scarifying means 5' against the ground, and thus to form the desired mounds, each beam 6' is actuated mechanically by a driven circular cam plate 30, 31, mounted on drive shaft 34, 35.

Each cam plate has an outwardly-projecting peripheral relatively short camming surface 32, 33 extending over an arc of about 20°, with an arcuate 340° portion over the remainder of the periphery. In the position shown in FIG. 3, the arcuate 340° portion of the cam plate lies against the beam 6', and holds the beam and therewith the associated disc 5' at the normal height relative to the surface of the ground. The two shafts 34, 35, and with them the cam plates 30, 31, are driven in synchronization with each other by way of a gear box 36, whose drive shaft 34, 35 can be driven by the output shaft of the engine of the towing vehicle. The two camming portions 32, 33 are located at the same angular positions, and consequently the beams 6' are pressed down simultaneously for a period determined by the gear box mechanism.

If the mounds are to be displaced with respect to each other in two rows, then the raised camming portions 32, 33 are displaced angularly in relation to each other to a corresponding extent.

It is also possible to increase the rate of rotation of the discs 5' to form a mound. The signal or pulse required for increasing the rate of rotation of the discs can be generated using a hydraulic valve or an electric switch, arranged to be actuated by the camming portions 32, 33 when the camming portions come into contact with the beams 6'.

The apparatus of the invention can be combined with a planting apparatus carried on the same vehicle, and such an embodiment is illustrated in FIG. 4. There, the vehicle 42 shown and described in FIG. 1 has been provided with two planting devices 37, 38, which can be of any suitable type, such as, for example, those described in any of U.S. Pat. Nos. 4,069,774 to Lofgren et al, dated Jan. 24, 1978; 4,067,268 to Lofgren et al, dated Jan. 10, 1978; 4,060,043 to Lofgren, dated Nov. 29, 1977; and 4,273,056 to Lofgren et al, dated June 16, 1981.

The vehicle carries a planting cab 39, from which the operator controls the feed of plants to the mounds of soil through the feed tubes 40, 41 that run through the cab 39, where the plants are stored, to the holes (not shown) dug by the digging and planting devices 43, 44 at the ends of the tubes 40, 41. These devices are controlled by the operator in cab 39, who is signalled to begin digging a hole and feeding a plant to the hole at the proper planting time by means of the control means 16.

While the drawings show embodiments which include two scarifying means, it is possible to operate with only one. If desired, more than two can be used, arranged side-by-side or in line, one behind the other, on the same vehicle.

The hydraulic motors and piston cylinder devices used to operate the various components can be replaced by other conventional drive means, such as pneumatic and electrical drive means.

Having regard to the foregoing disclosure, the following is claimed as the inventive and patentable embodiments thereof:

1. A ground-clearing and mound-building device that can be towed along the ground to move material on the surface to one side, expose the surface of the ground, and build mounds on the cleared ground for planting and forest regeneration, comprising, in combination:
   (1) a frame arranged to be attached to a vehicle above the ground;
   (2) a scarifying means mounted on the frame for rotation abouts its central axis, circular in cross-section and having a peripheral surface that digs into the ground during rotation thereof when in contact with the ground under pressure;
   (3) means for moving the scarifying means into and away from contact when the ground and arranged to bring the scarifying means into such contact with the ground at any of a plurality of selected contact pressures;
   (4) drive means for rotating the scarifying means at a selected rotation rate; and
   (5) means for controlling at least one of the selected contact pressure and the selected rotation rate to dig, loosen, and displace a surface layer of the ground and push such loosened ground into mounds.

2. Apparatus according to claim 1 in which the means for controlling one of contact pressure and rotation rate is arranged to increase contact pressure to a pressure at which the advancing scarifying means forms a mound of soil in front of it and then decreases contact pressure to deposit the mound.

3. Apparatus according to claim 1 in which the means for controlling one of contact pressure and rotation rate is arranged to increase the speed at which the scarifying means rotates to a speed at which the advancing scarifying means forms a mound in front, and then decrease the speed of rotation to deposit the mound.

4. Apparatus according to claim 1 comprising measuring means arranged to measure the distance travelled by the scarifying means over the surface of the ground and at a predetermined distance send a control signal to the controlling means to change at least one of the contact pressure and rate of rotation of the scarifying means while keeping the scarifying means constantly in contact with the ground.

5. Apparatus according to claim 1 in which the scarifying means is a truncated cone, with the apex of said cone arranged to extend outwardly from the vehicle.

6. Apparatus according to claim 5, in which the cone has a plurality of digging protuberances on its surface.

7. Apparatus according to claim 1 in which the scarifying means is a disc.

8. Apparatus according to claim 1 in which the means for moving the scarifying means and the drive means are hydraulically operated.

9. Apparatus according to claim 1 in which the means for moving the scarifying means and the drive means are mechanically operated.

* * * * *